United States Patent [19]

Masumoto et al.

[11] Patent Number: 5,369,731
[45] Date of Patent: Nov. 29, 1994

[54] ASYNCHRONOUS CONTROL SYSTEM FOR A NEURO COMPUTER

[75] Inventors: Daiki Masumoto, Yokohama; Hideki Kato, Tokyo; Hideki Yoshizawa, Tokyo; Hiroki Iciki, Tokyo, all of Japan

[73] Assignee: Fujitsu Limited, Kawasaki, Japan

[21] Appl. No.: 757,344

[22] Filed: Sep. 10, 1991

[30] Foreign Application Priority Data

Sep. 10, 1990 [JP] Japan .................. 2-237231

[51] Int. Cl.$^5$ .............................. G06F 15/18
[52] U.S. Cl. ................................... 395/24
[58] Field of Search ............... 395/24, 11, 27

[56] References Cited

U.S. PATENT DOCUMENTS

| | | | |
|---|---|---|---|
| 4,926,064 | 5/1990 | Tapang | 395/24 |
| 4,941,122 | 7/1990 | Weideman | 395/11 |
| 4,947,482 | 8/1990 | Brown | 395/24 |
| 4,996,648 | 2/1991 | Jourjine | 395/25 |
| 5,131,072 | 7/1992 | Yoshizawa et al. | 395/24 |
| 5,142,666 | 8/1992 | Yoshizawa et al. | 395/27 |

FOREIGN PATENT DOCUMENTS 0378115  7/1990  European Pat. Off. .

OTHER PUBLICATIONS

Van Den Bout, D. et al., "A digital architecture employing stochasticism for the simulation of Hopfield neural nets", *IEEE Transactions on Circuits and Systems*, vol. 36, No. 5, New York, May 1989, pp. 732–738.

Kak, S. et al., "Bicameral neural network where information can be indexed", *Electronics Letters*, vol. 25, No. 3, Enage, GB, Feb. 2, 1989, pp. 203–205.

Yasunaga, M. et al., "Design, fabrication and evaluation of a 5-inch wafer scale neural network LSI composed of 576 digital neurons", *International Joint Conference on Neural Networks*, vol. 2, Jun. 17, 1990, San Diego, pp. 527–535.

Hashemian, P., "A controller to improve the convergence of a neural network", *Proceedings Southeastcon 90*, vol. 1, Apr. 1, 1990, New Orleans, pp. 69–71.

*Primary Examiner*—Allen R. MacDonald
*Assistant Examiner*—George Davis
*Attorney, Agent, or Firm*—Staas & Halsey

[57] ABSTRACT

An asynchronous control system for a neuro computer, includes an inter-connected type neural network composed of a plurality of neurons for multiplying a plurality of input signals with corresponding weights, calculating a total sum-of-products of the input signals and weight, thereby providing the sum-of product signals, and converting the sum-of-product signal using a non-linear function. A weight memory is provided for storing data of the weights for said neurons, and a controller is provided for generating a control pattern which controls the neural network. A selector randomly selects one of the neurons which performs signal processing during one processing cycle.

2 Claims, 16 Drawing Sheets

COMMON ANALOG BUS
ANP: ANALOG NEURON PROCESSOR
S/H : ANALOG SAMPLE/HOLD CIRCUIT

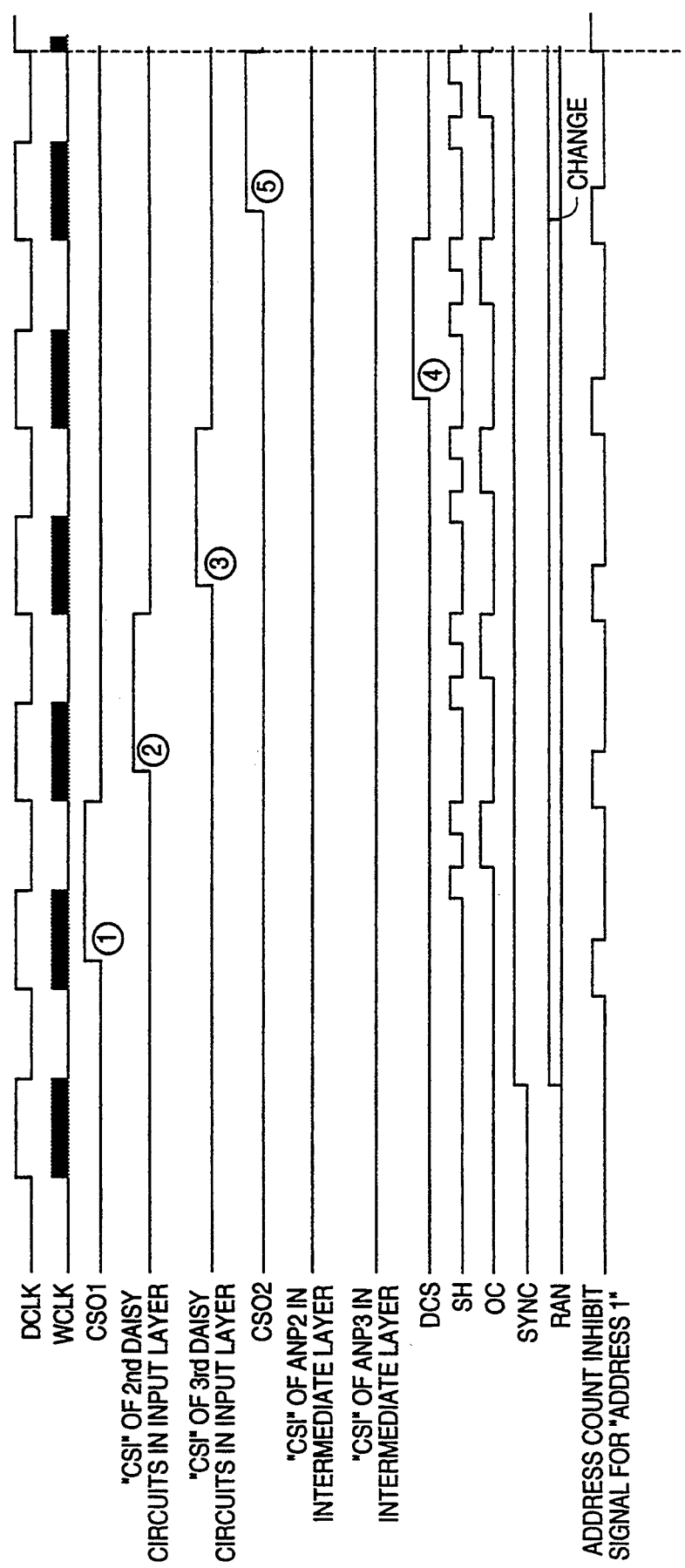

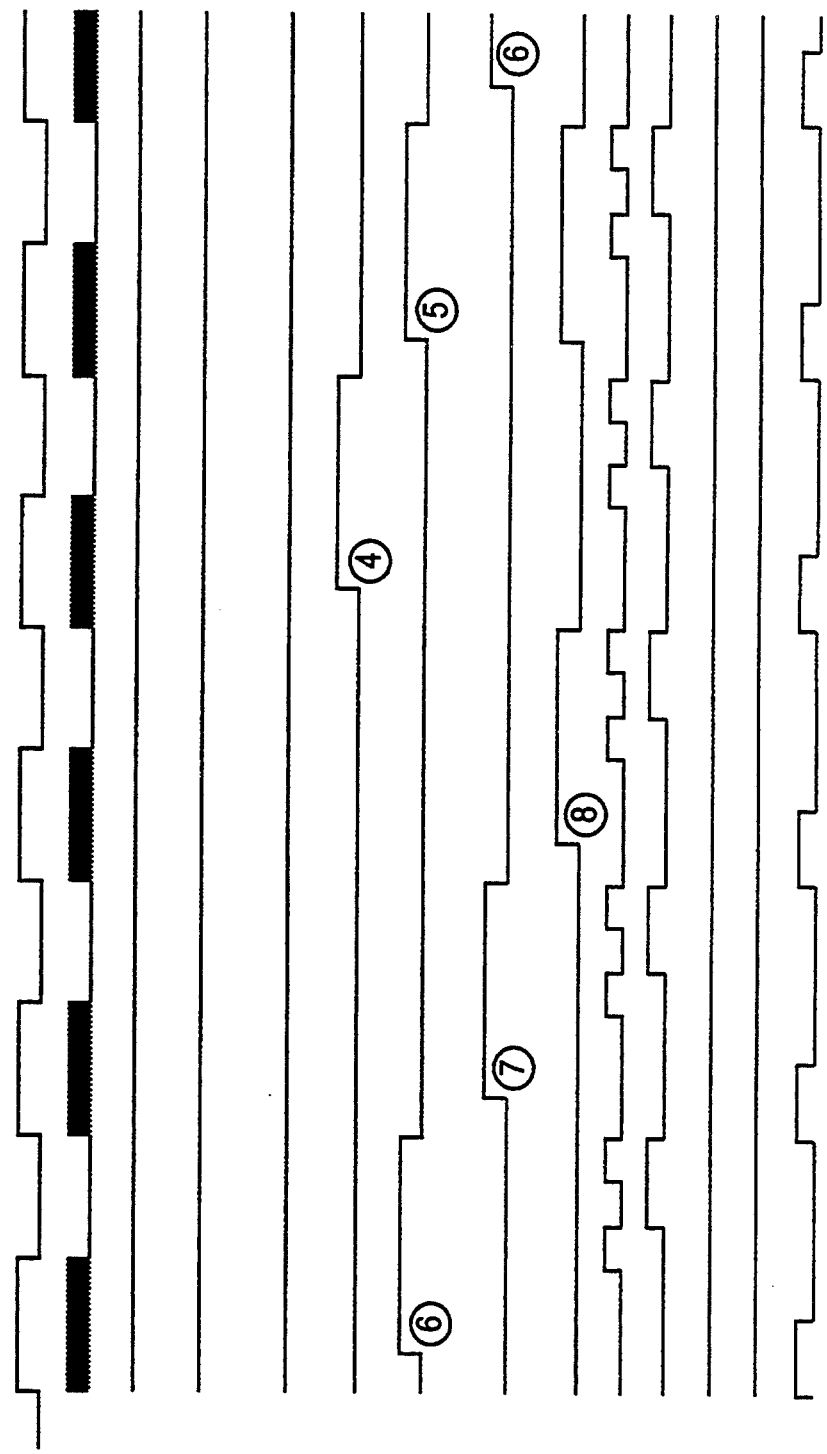

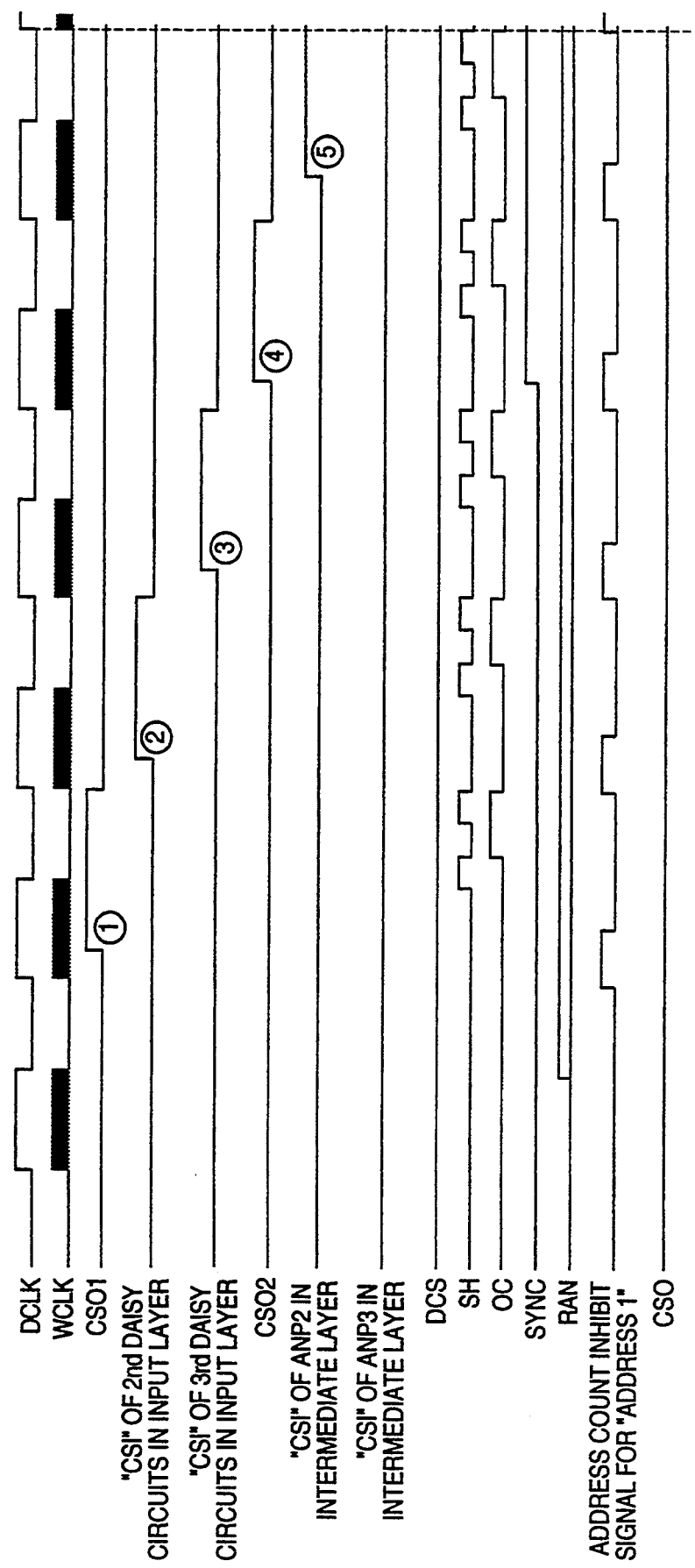

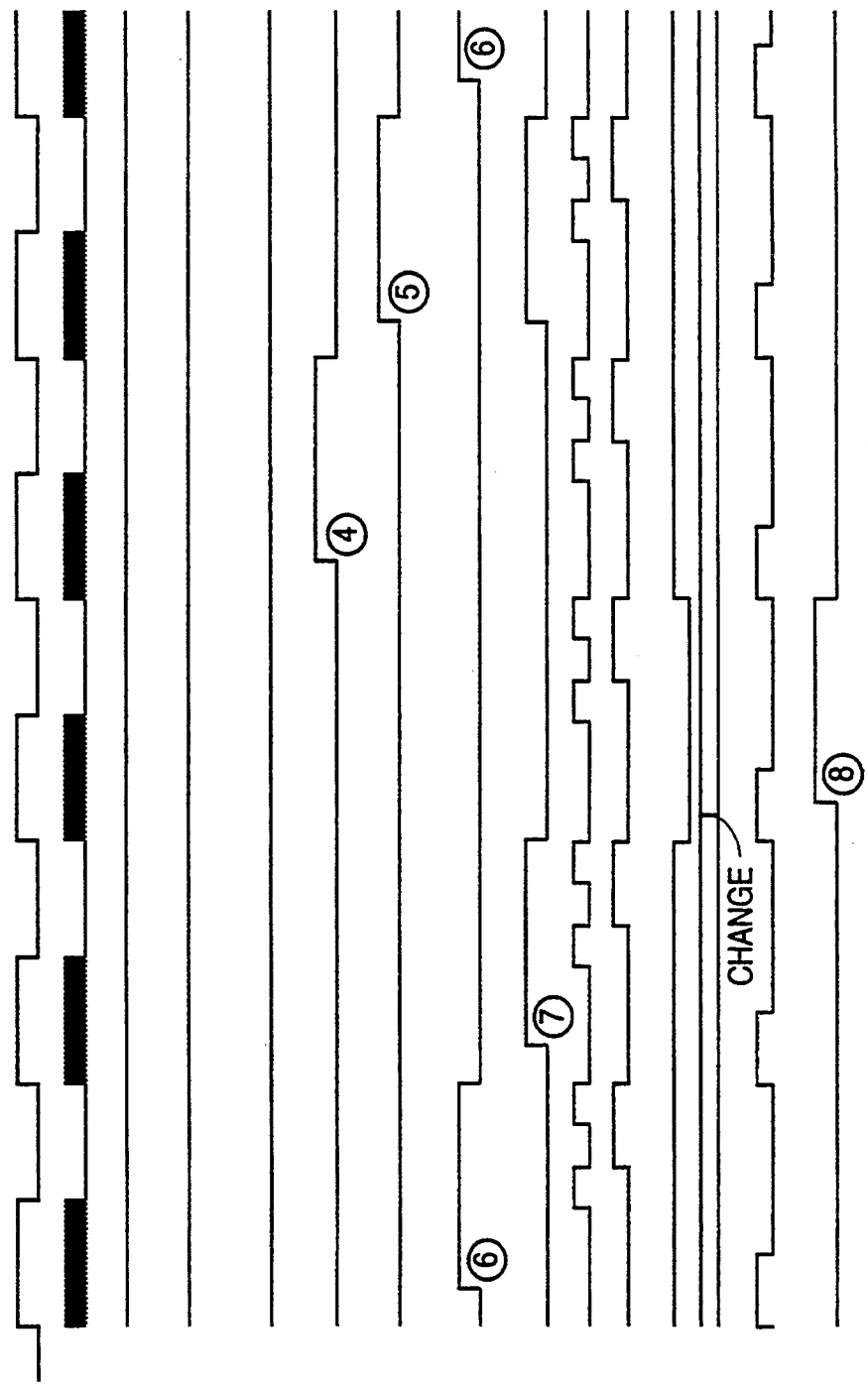

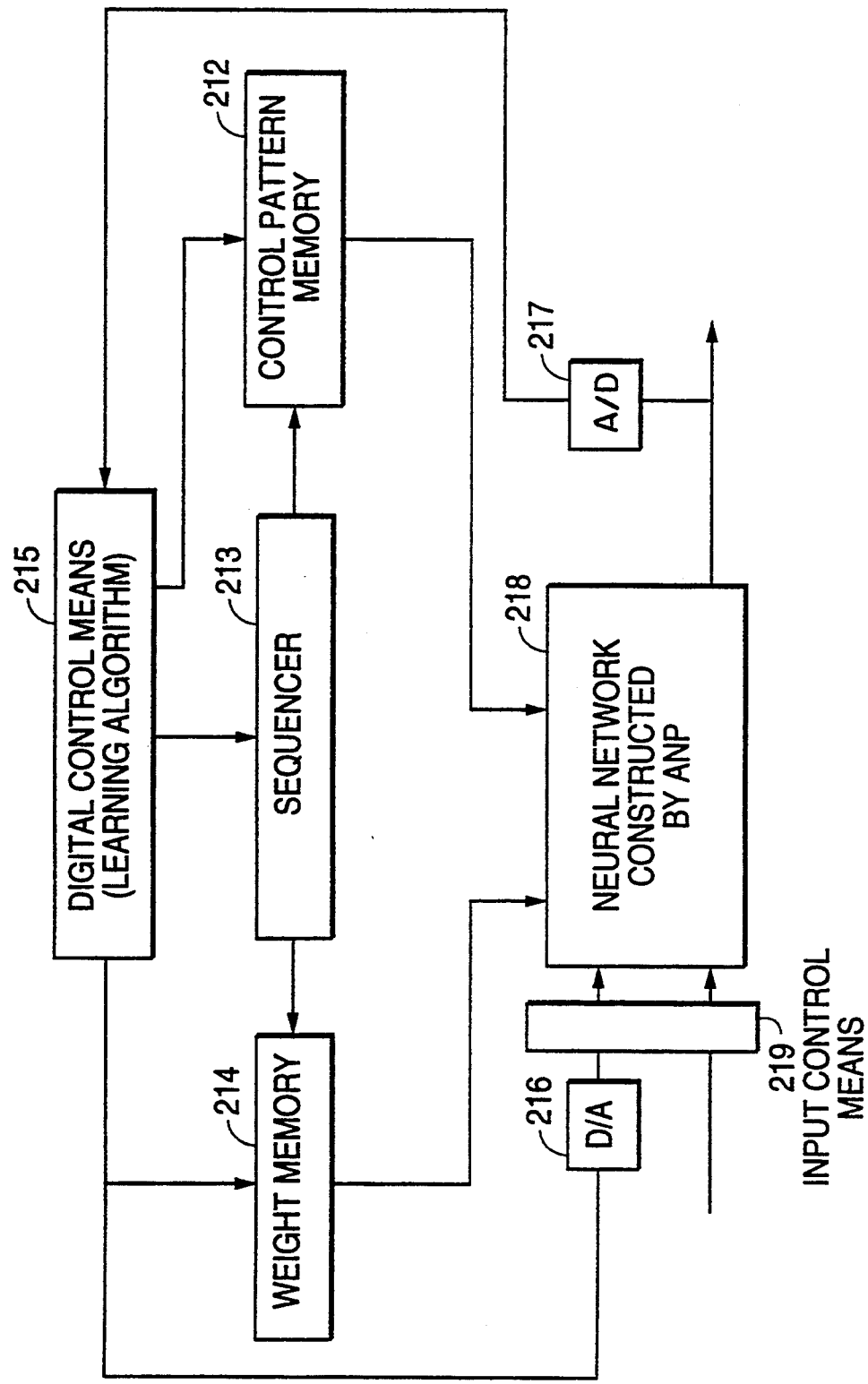

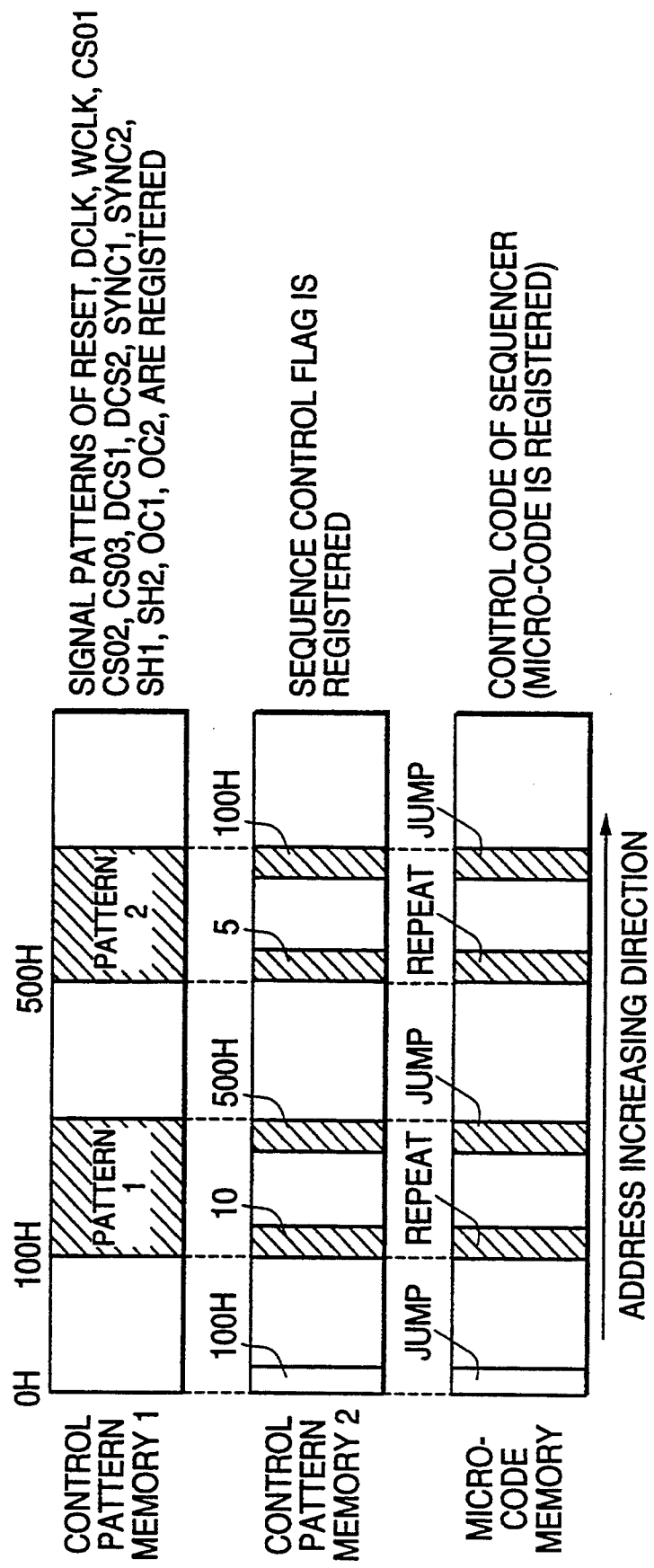

ASYNCHRONOUS CONTROL SYSTEM FOR A NEURO COMPUTER

BACKGROUND OF THE INVENTION

Field of the Invention

The present invention relates to a system for controlling neurons constituting a neuro computer in an asynchronous fashion.

Background of thee Related Art

In order to converge an output pattern of a Hopfield type neuro computer to a stable solution without reaching a so-called periodic vibration solution in which the same output pattern is repeated instead of reaching a solution, a method is known in which the number of neurons which perform a signal processing in one processing cycle is limited to one.

The conventional Hopfield type neuro computer may employ the following systems:
1) a software simulation on a host computer;
2) a synchronous control, that is, controling all neurons so as to simultaneously perform the signal processing at the price of deterioration of converging characteristics; and
3) to realize the entirety of a neuro computer by analog circuits.

However, the above-mentioned systems have the following drawbacks.

According to the system 1), when the neuro computer is incorporated into the machine in use, the neuro computer should be reduced in volume. However, this system 1) a needs host computer so that the neuro computer cannot be more compact in size than a host computer and the output pattern of such a neuro computer takes a long time to converge.

According to the system 2), with respect to the Hopfield type neuro computer, a deterioration of converging characteristics, for example, a periodic vibration solution of cycle 2 exists. As a result, the neuro computer is difficult to handle. That is, an output pattern (0101) appears after an output pattern (1010) and then the output pattern (1010) repeatedly appears again. The same output pattern (1010) repeatedly appears on the second cycle (this phenomenon is referred to as the cycle 2).

According to the system 3), the neuro computer cannot be controlled in a synchronous control fashion, and it is frequently observed that the output pattern becomes a vibration solution due to the high-order delay of element and a delay caused by a wiring of an interconnection.

For this reason, the application field of the Hopfield type neuro computer is limited to a very small area.

SUMMARY OF THE INVENTION

The present invention is intended to realize a Hopfield type neuro computer with a small size which can realize a synchronous control and which can be assembled into a machine in actual practice, and converged at high speed, and which has no periodic solution.

A feature of the present invention resides in an asynchronous control system for a neuro computer, comprising an inter-connected type neural network composed of a plurality of neurons for multiplying a plurality of input signals with corresponding weights, calculating a total sum-of-products of the input signals and weight, thereby providing the sum-of product signals converting said sum-of-product signal by converting said sum-of-product signal by a non-linear function, a weight memory for storing data of said weights for said neurons, a controller for generating a control pattern which controls said neural network, and selecting means for randomly selecting one of said neurons which performs signal processing during one processing cycle.

BRIEF DESCRIPTION OF THE DRAWINGS

FIGS. 6A and 6B show a timing chart of the embodiment shown in FIG. 5;

FIGS. 8A and 8B show a timing chart of the embodiment shown in FIG. 7,

FIG. 9 designates a block diagram of a system in which an analogue neuron processor (ANP) is used;

FIG. 15 shows a block diagram of a control pattern memory.

DESCRIPTION OF THE PREFERRED EMBODIMENTS OF THE INVENTION

Figure 1A:
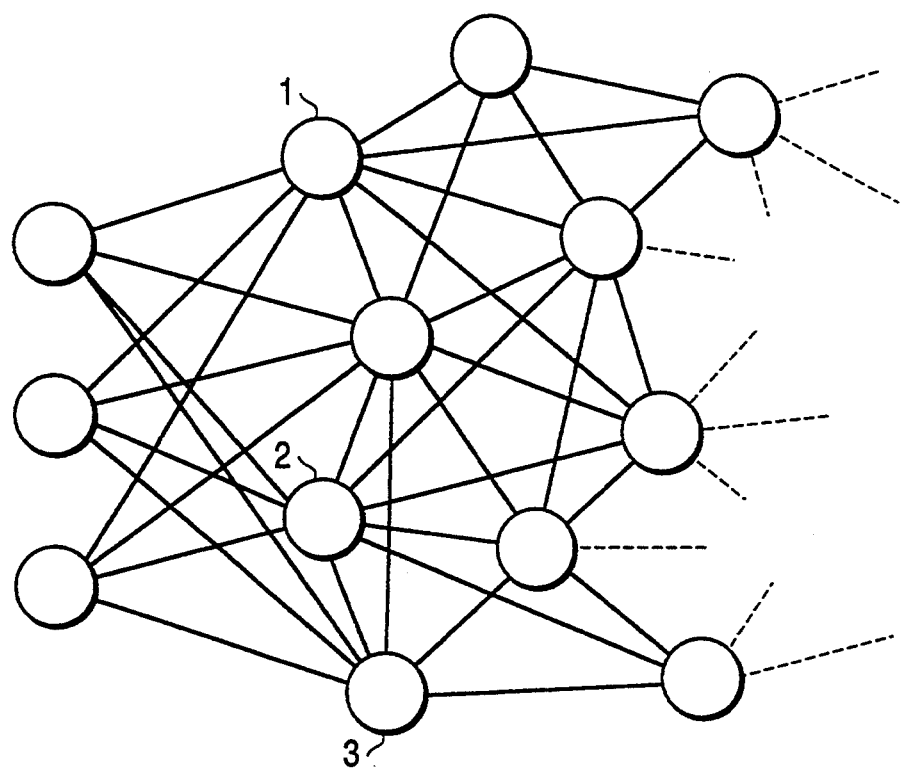
FIGS. 1A, 1B and 1C show a concept of a mutual connection type neuro computer.

In general, an interconnection type neural network is formed by the connection of neurons such as 1, 2, and 3 as shown in FIG. 1A.

Figure 1B:
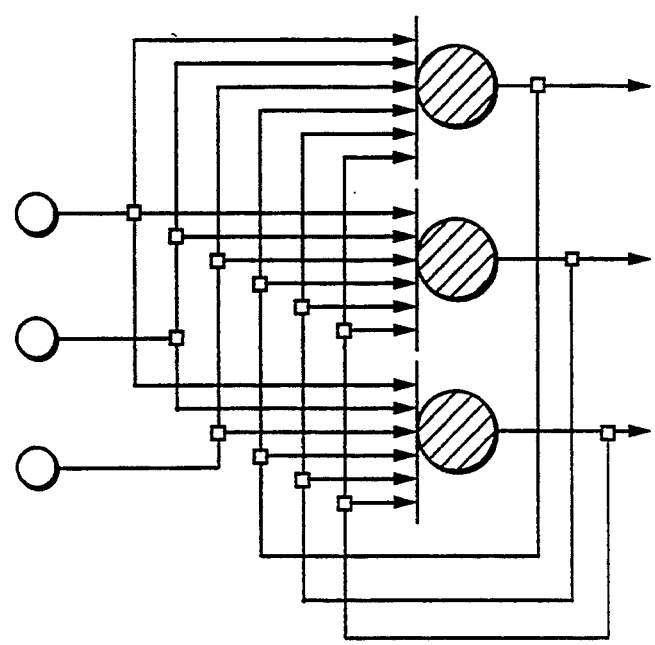
Figure 1C:
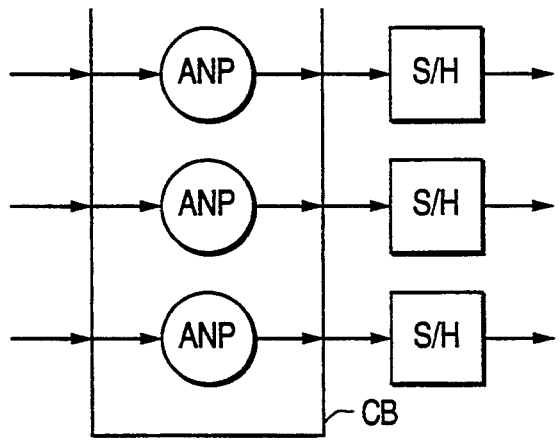

FIG. 1B shows an example of a Hopfield type neural network and FIG. 1C shows a block diagram of the Hopfield type neural network which is realized by using a time-divisional common analog bus. The neural network shown in FIG. 1C is disclosed in detail in U.S.S.N. 486,644 filed on Feb. 28, 1990.

Figure 2:
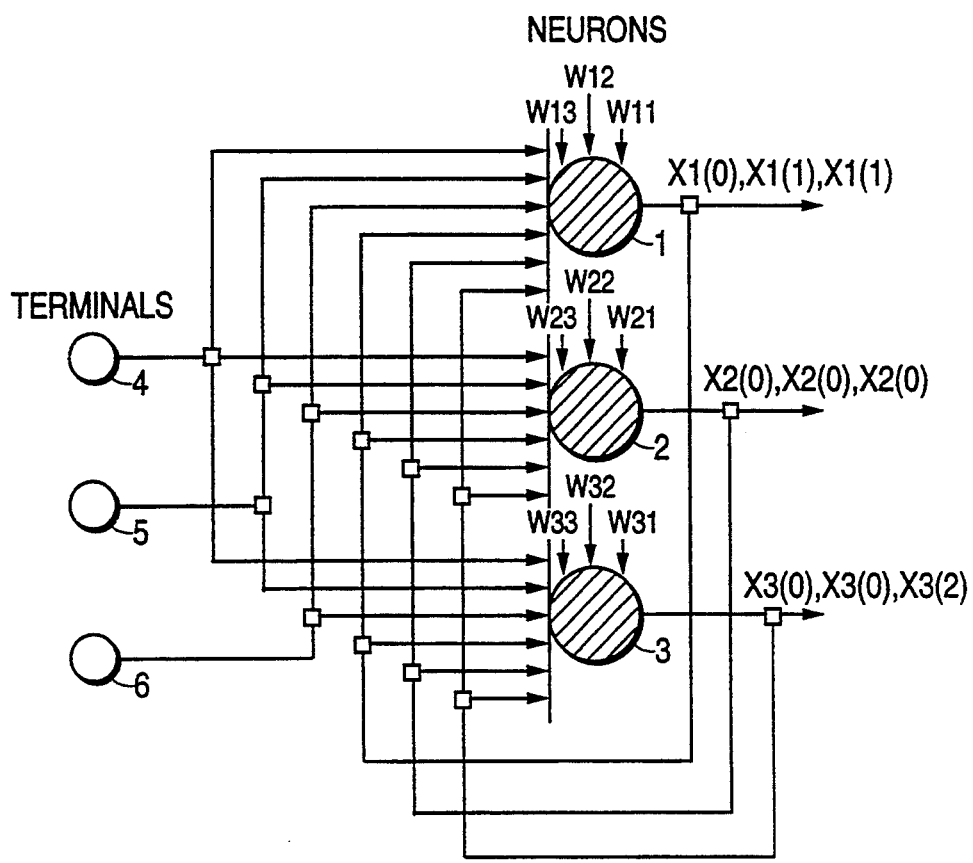
FIG. 2 shows an explanatory view of a principle of the mutual connection type neuro computer.

FIG. 2 is a conceptual diagram of an interconnection type network. A neural network formed by neurons which have no couplings fed back to themselves ($w_{ii}=0$) and which are reciprocally coupled to other neurons ($W_{ij}=W_{ji}$)is called a standard type Hopfield network. In this standard Hopfield network, if the respective neurons change their state in an asynchronous fashion, then it is assured that the output pattern thereof is converged without reaching a periodic vibration solution. To this end, the number of neurons which perform signal processing in one processing cycle must be limited to one. Selecting means for selecting the neuron is not restricted and for example, may be selected randomly.

In FIG. 2, reference numerals 1, 2 and 3 depict neurons.

Reference numerals 4, 5 and 6 depict terminals to which initial values and external signals are input.

Figure 3:
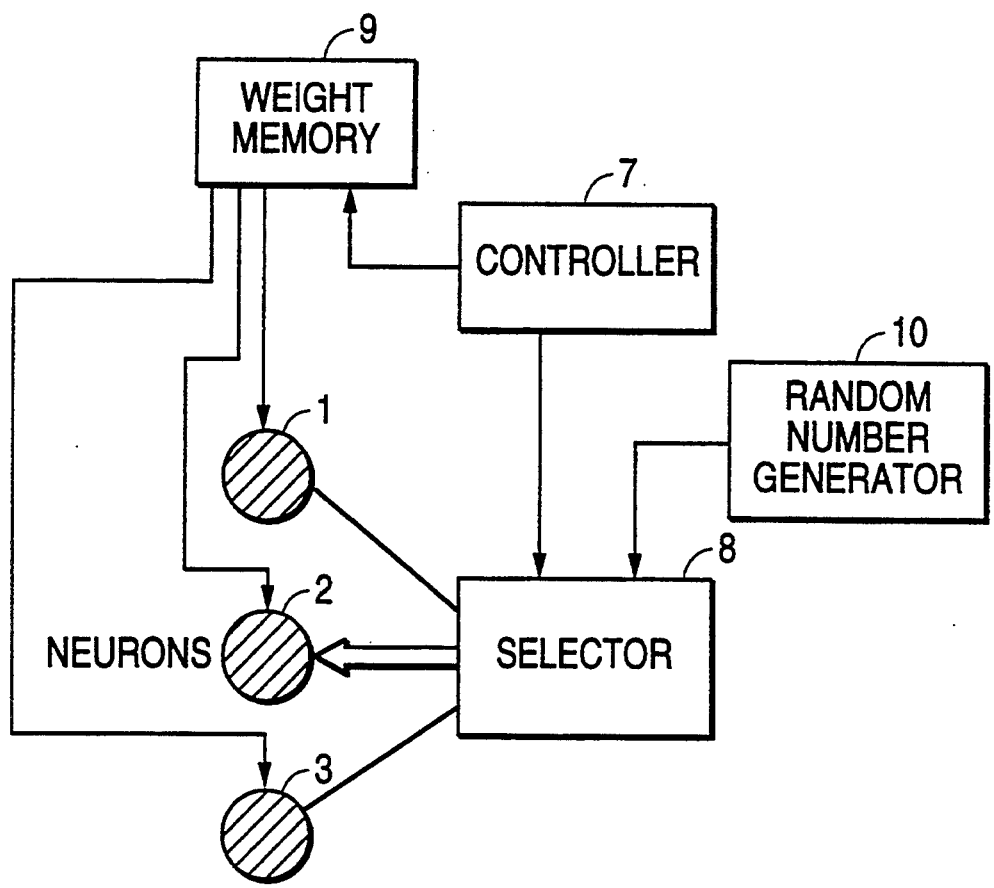
FIG. 3 shows a principle of the first invention.

FIG. 3 is a diagram used to explain a principle of the first invention. The neurons, interconnection and terminals are the same as those of FIG. 2 (interconnection and terminals are not shown).

Reference numeral 7 designates a controller which generates control patterns.

Reference numeral 8 designates a selector for selecting a neuron which performs the signal processing.

Reference numeral 2 designates a neuron which is selected by the selector 8 at that time.

The first invention will be described in terms of the sequential order of operation with reference to FIGS. 2 and 3 from a time standpoint.

Initial values x1(0), x2(0) and x3(0) applied to initial value input terminals 4, 5 and 6 are input to respective neurons, and a neuron which performs the signal processing is selected by the selector 8. In this case, let it be assumed that the neuron 1, for example, is selected by the selector 8.

The neuron 1 calculates the inner product of the initial values x1(0), x2(0), x3(0) and weights w11, w12, w13 which are the outputs of the weight memory 9, and outputs a value x1(1) which results from converting the calculated result of the inner product by a non-linear function, which is the first calculation cycle.

The value x1(1) is fed back to the input of the neuron 1, whereby the initial value x1(0) is canceled and x1(1), x2(0), x3(0) are respectively input to neurons.

Then, a neuron which performs the signal processing is selected by the selector 8. Let us assume that a neuron 3, for example, is selected by the selector 8.

The neuron 3 calculates the inner product of x1(1), x2(0), x3(0) and weights w31, w32, w33 and outputs a value x3(2) which results from converting the calculated result of the inner product by a non-linear function, which is the next calculation cycle.

The value x3(2) is fed back to the input of the neuron 3, whereby the initial value x3(0) is canceled and x1(1), x2(0), x3(2) are input to respective neurons. If this cycle is repeated, then the output pattern of the neuro computer reliably reaches the stable solution.

Figure 4:
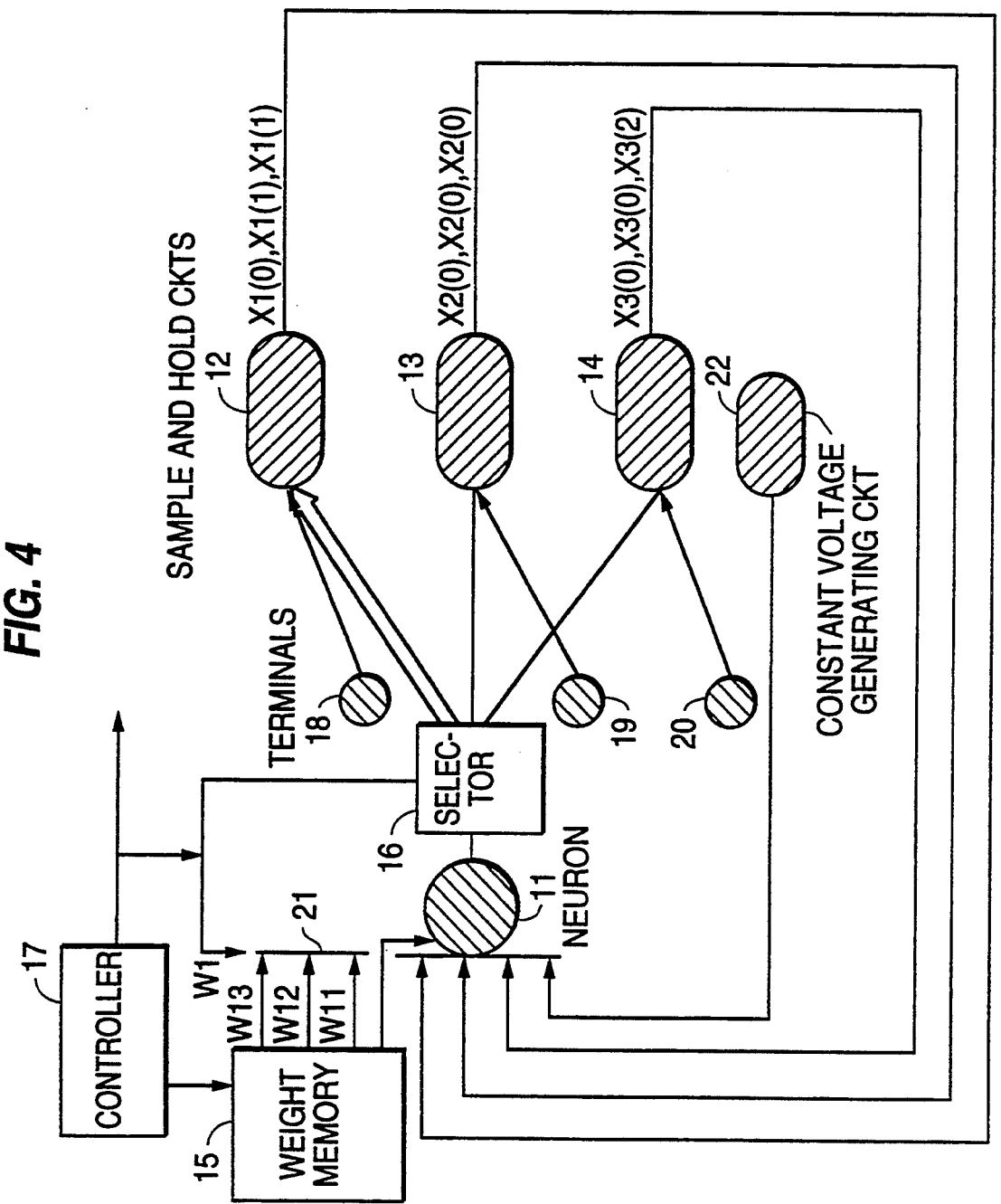
FIG. 4 shows a principle of the second invention.

FIG. 4 is a schematic diagram used to explain the principle of the second invention.

In FIG. 4, reference numeral 11 depicts a neuron, and 12, 13 and 14 depict sample and hold circuits. Inputs of the sample and hold circuit units are all coupled to an output of the neuron 11 via a selector 16, and outputs thereof are all coupled to respective inputs of the neuron 11.

Reference numeral 15 designates a weight memory which stores weight data. Reference numeral 16 designates a selector for selecting the sample and hold circuits 12, 13 and 14 to which there are set output corresponding to the weight data loaded by the neuron 11. The sample and hold circuits 12–14 may be conventional switched storage capacitors with buffer amplifiers, e.g., as described in the *Electronics Engineers' Handbook*, McGraw-Hill, 1982.

Reference numeral 17 depicts a controller which derives control patterns and address signals of the weight memory 15.

Reference numerals 18, 19 and 20 depict input terminals to which initial values and external signals are input.

Incidentally, instead of using the controller 17 to select the address of the weight memory 15, the selector 16 may be used to randomly select the output data of the weight memory 15 via a multiplexer 21.

The second invention will be described in the sequential order of operation with reference to FIG. 4 from a time standpoint.

A constant voltage v is generated from a constant voltage generating circuit 22.

Initial values x1(0), x2(0) and x3(0) applied to the initial value input terminals 18, 19 and 20 are respectively input to the sample and hold circuits 12, 13 and 14 coupled to the input terminals 18, 19 and 20.

A set of weight data to be signal-processed is selected by the selector 16 through the selector 21. In this case, let it be assumed that a set of the weight data w1=(w11, w12, w13) is selected by the selector 16. Simultaneously, the sample and hold circuit 12 also is selected.

The neuron 11 calculates the inner product of x1(0), x2(0), x3(0), the output v of the constant voltage generating circuit 22, and the weights w11, w12, w13 (w1) and outputs a value x1(1) which results from converting the calculated result of the inner product by the non-linear function. This value x1(1) is held in the sample and hold circuit 12, which is the first calculation cycle.

The value x1(1) is fed back to the input of the neuron 11 and x1(1), x2(0), x3(0) and v are input to the neuron 11.

A set of weight data to be signal-processed is selected by the selector 16. In this case, let it be assumed that w3=(w31, w32, w33) is selected. Simultaneously, the sample and hold circuit 13 is also selected.

The neuron 11 calculates the inner product of x1(1), x2(0), x3(0), v and the weights w31, w32, w33 and outputs a value x3(2), which results from converting the calculated result of the inner product by the non-linear function. This value x3(2) is held in the sample and hold circuit 14.

This is the next calculation cycle.

Then, the value x3(2) is fed back to the input of the neuron 11, and x1(1), x2(0) and v are input to the neuron 11. If this cycle is repeated, the output pattern of the neuro computer reaches the stable solution reliably.

Figure 5:
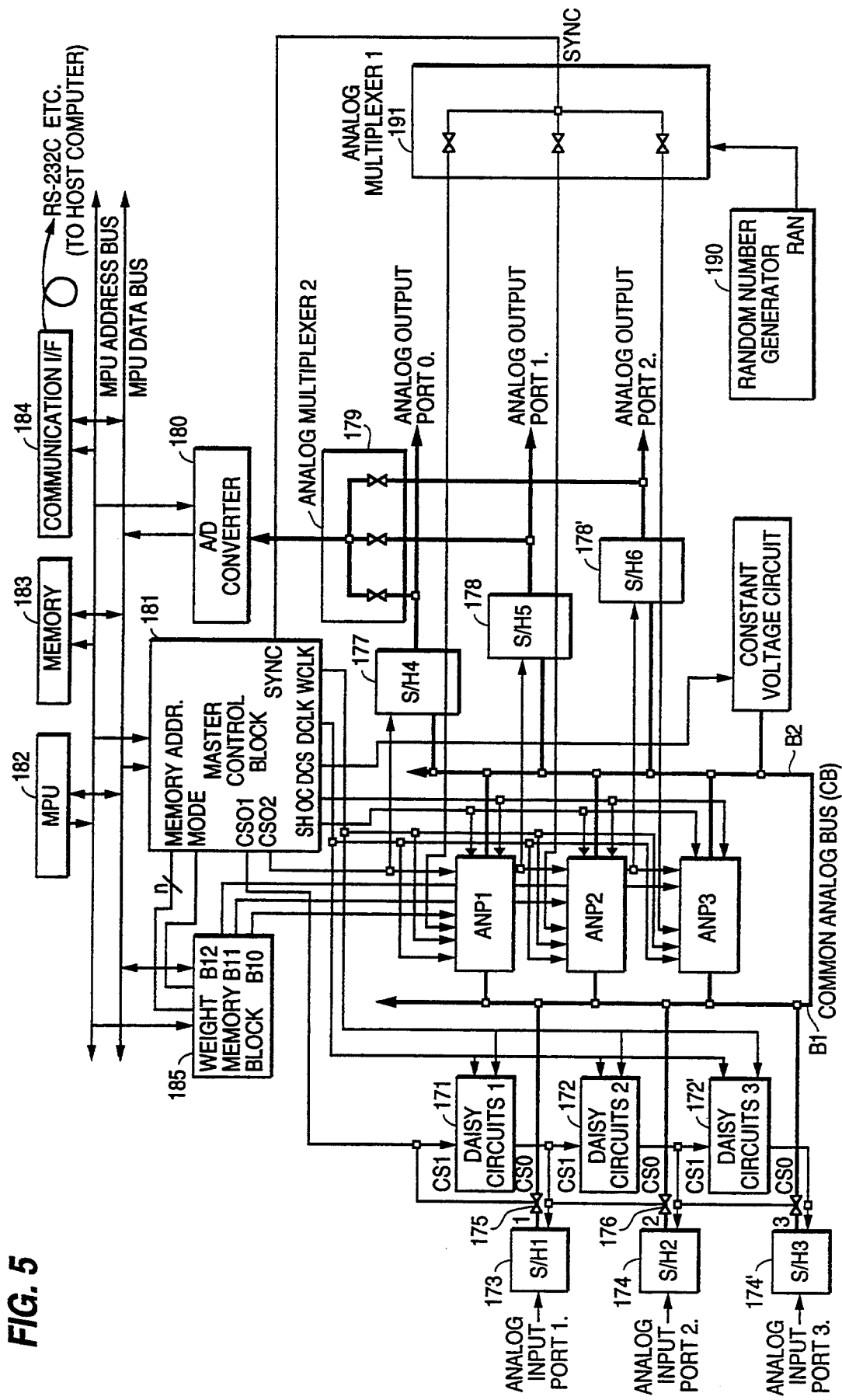
FIG. 5 shows a block diagram of an embodiment of the first invention.

FIG. 5 shows an embodiment of the first invention, wherein the cross-coupling of the ANDS (analog neuroprocessors) is realized by means of a common analog bus CB of U-letter configuration. FIG. 6 is a timing chart thereof.

As shown in FIG. 5, outputs of the memory address terminal and of the mode terminal of a master control block 181 are applied to a weight memory block 185. B10, B11 and B12, which are data outputs of the weight memory block 185, are connected to ANP1, ANP2 and ANP3, respectively.

Input of Initial Values

An initial value x1(0) of the ANP1 is supplied to an analog input portion 1, an initial value x2(0) of the ANP2 to an analog input port 2, and an initial value x3(0) of the ANP3 to an analog input port 3, respectively.

The initial and subsequent processing cycles will be described with respect to FIG. 5 and FIGS. 6A to 6B.

<Initial Value Processing Cycle>

1) An output signal from a CSO1 terminal (see FIG. 10 which will be referred to later) of the master control block 181 is supplied to a daisy circuit (1) 171 which is a time delay circuit and a switch (1) 175. At the leading edge of this output signal, a signal x1(0) from a sample and hold circuit (I) 173 connected to the analog input port 1 is supplied to the common analog bus CB.

As shown in FIG. 6, an ANPi (i=1, 2, 3) performs one product and sum calculation during one cycle of a DCLK signal. When the DCLK signal is high in level, a weight clock WCLK is generated so that the ANPi multiplies digital weight data wi1 supplied thereto in synchronism with the weight clock WCLK and the signal x1(0) supplied to the common analog bus B1 from the analog input port 1. When the DCLK signal is low in level in its latter half cycle, then a sample and hold signal SH goes high in level, whereby a capacitor of an integrator within the ANPi performs a sum operation.

When an OC signal from the master control block 181 goes high in level, then the ANPi performs the offset cancel operation. When the sample and hold signal SH goes high in level again, then the sample and hold circuit 173 samples and holds the input signal so that one product and sum calculation is ended. Thus, a charge corresponding to wi1 x1(0) is accumulated in the capacitor.

2) The output signal CSO1 is delayed by a predetermined delay time by the daisy circuit (1) 171 and is thereby produced as an output CSO. This output CSO is supplied to daisy circuit (2) 172 as an input signal CSI, whereby a signal x2(0) of sample and hold circuit (2) 174 connected to the analog input port 2 is supplied to the common analog bus CB through a switch (2) 176. The ANPi calculates this signal x2(0) in a product and sum fashion, thereby a charge corresponding to wi1 x1(0)+wi2 x2(0) being accumulated in the capacitor.

3) Similarly, the signal x3(0) applied to the analog input port 3 is supplied to the common analog bus CB. The ANPi calculates this signal x3(0) in a product and sum fashion, whereby a charge corresponding to wi1 x1(0)+wi2 x2(0)+wi3 x3(0) is accumulated in the capacitor.

4) A DCS signal is generated from the master control block 181 and the ANPi calculates the fixed voltage v and the weight wi in a product and sum fashion, whereby a charge corresponding to wi1 x1(0)+wi2 x2(0)+wi3 x3(0)+wiv is accumulated in the capacitor.

An analog output signal xi(1), which results from converting the above charge by a sigmoid function circuit, is output in the succeeding processing cycle, if necessary. This initial value processing cycle employs the conventional system in which all neurons perform the signal processing simultaneously. This output xi(1) generated from each of the neurons at the completion of this processing cycle becomes an initial value when the asynchronous control is started, or when the random control is started. (Random control uses the random number from the random number generator.) In other words, the input signal from the analog input port 1 is simultaneously supplied to ANPs 1, 2 and 3 and simultaneously calculated in a product and sum fashion by the ANPs 1, 2 and 3. Then the input signal from the analog input port 2 is simultaneously supplied to ANPs 1, 2 and 3 and simultaneously calculated by the ANPs 1, 2 and 3. Finally the input signal from the analog input port 3 is simultaneously supplied to ANPs 1, 2 and 3 and simultaneously calculated in a product and sum fashion by the ANPs 1, 2 and 3. The output signal xi(1) can be set arbitrarily.

<Processing cycle>

A signal SYNC from the master control block 181 is used to determine if the ANP executes the product and sum calculation. When this signal SYNC is high in level, the ANP carries out the product and sum calculation, when it is low in level, the ANP does not carry out the product and sum calculation. This signal SYNC is input to a multiplexer 191. The multiplexer 191 is coupled to the respective ANPs and can select the ANP to which the signal SYNC is input by a signal RAN. The signal RAN is generated by a random number generating circuit 190, and this random number generating circuit 190 randomly selects any one of the ANP1, ANP2 and ANP3 to thereby generate the signal RAN in synchronism with the processing cycle.

5) A CSO2 signal is output from the master control block 181, and the analog output signal x1(1) from the ANP1 is fed through the common analog bus CB back to the input side of the ANP1.

An ANPj to which the signal SYNC is input and which is randomly selected calculates the analog output signal x1(1) in a product and sum fashion so that xj1x1(1) is accumulated in the capacitor.

6) After having been delayed by a predetermined delay time, the CSO signal of the ANP1 is applied to the ANP2 and an analog output x2(1) from the ANP2 is fed back to the common analog bus CB.

The ANPj to which the signal SYNC is input calculates x2(1) in a product and sum fashion so that a charge corresponding to wj1x1(1)+wj2x2(1) is accumulated in the capacitor.

7) Similarly, the ANPj calculates x3(1) in a product and sum fashion, and hence, a charge corresponding to wj1x1(1)+wj2x2(1)+wj3x3(1) is accumulated in the capacitor.

8) The DCS signal is generated from the master control block 181 and the ANPj calculates the fixed voltage v and the weight wj in a product and sum fashion, whereby a charge corresponding to wj1x1(1)+wj2x2(1)+wj3x3(1)+wjv is accumulated in the capacitor. In synchronism with the product and sum calculation cycles of 5), 6) and 7), the outputs xi(1) of the ANPi (i=1, 2, 3) are respectively supplied to the analog output ports through the sample and hold circuits 177, 178 and 178'.

Further, the above outputs xi(1) are supplied through the analog multiplexer 179 and the A/D converter 180 to a digital control circuit composed of an MPU 182, a memory 183 and a communication interface 184. The MPU 182 determines if the neuron output xi(1) of the present time is equal to the neuron output xi(0) of the last time. If the condition that the neuron outputs xi(1) and xi(0) are equal to each other is continued longer than a predetermined time, then the MPU 182 determines that the output pattern of the neuro computer is converged.

The output pattern of the neuro computer can reach the stable solution by repeating the above processing cycles.

The signal SYNC is generated from the master control block 181 and applied to the multiplexer 191 whose output is selected in response to the output of the random number generator 190. The output of the multiplexer 191 is applied to the respective ANPs 1, 2 and 3, and one of these ANPs 1, 2 and 3 is randomly selected by the output RAN of the random number generator 190.

Operation of the present invention will be described more fully with reference to 1 through 8 of the timing chart shown in FIGS. 6A–6B. As shown in FIGS. 6A and 6B, the ANP1 performs one product and sum calculation in one cycle of the DCLK signal so that, when the DCLK signal is high in level, the weight clock WCLK is generated, and digital weight data input thereto in synchronism with the weight clock WCLK and the analog input signal are multiplied with each other. When the DCLK signal is low in level in the latter half of one cycle, the sample and hold signal SH goes high in level so that the capacitor of the integrator within the ANP performs the sum operation. More specifically, during the period 1 in which the CSO1 signal, that is, the CSI signal of the daisy circuit 1 is high in level, the ANPs 1, 2 and 3 calculate the analog signal on the bus B1 in a product and sum fashion. When the OC signal from the master control block 181 goes high in level, then the ANPs 1, 2 and 3 performs the offset cancel operation and the sample and hold operation is performed, thereby one product and sum cycle is finished. Then, since the input signal CSI of the second daisy circuit 172 goes high in level during the cycle 2, the ANPS 1, 2 and 3 calculate the input signal from the next analog input port in a product and sum fashion. After the product and sum cycle is ended, the CSI signal is supplied to the daisy circuit 172' and the output signal is generated from the sample and hold circuit 174', whereby the neuro computer enters the third product and sum calculation cycle as shown by 3 in FIG. 6A.

The DCS signal is generated from the master control block 181 as shown by 4 in FIGS. 6A and 6B. When the next sample and hold signal is high in level, the ANPi calculates the fixed voltage v and the weight wi in a product and sum fashion, thereby a charge corresponding to $wi1\ x1(0)+wi2\ x2(0)+wi3\ x3(0)+wiv$ is accumulated in the capacitor.

An analog output signal $xi(1)$, which results from converting the above output signal by the sigmoid function circuit, is output in the succeeding processing cycle, if necessary.

The CSO2 signal is generated from the master control block 181 as shown by 5 in FIGS. 6A and 6B and the signal formed in the product and sum cycle of the last time is fed through the common analog bus CB to the master control block from the ANP1, whereby one of the ANPS 1, 2 and 3, an $ANP_j$ supplied with the signal SYNC calculates the above fed-back signal in a product and sum fashion. Then, after having been delayed by a predetermined delay time, the CSO output signal of the ANP1 is applied to the ANP2 during the cycle 5, and the ANP2 derives the signal accumulated in the capacitor in the last product and sum cycle. This signal is fed through the common analog bus CB back to the master control block 181, whereby the $ANP_j$ supplied with the signal SYNC is driven to perform the product and sum calculation during the cycle 6. Similarly, after having been delayed by a predetermined delay time, the CSO signal of the ANP2 is applied to the ANP3 during the cycle 6, and the output from the ANP3 is fed through the common analog bus CB back to the master control block 181, whereby the ANP3 supplied with the signal SYNC performs the product and sum calculation during the cycle 7. The DCS signal is generated from the master control block 181 and the ANPj calculates the fixed voltage v and the weight wj in a product and sum fashion, thereby a charge corresponding to $wj1x1(1)+wj2x2(1)+wj3x3(1)+wjv$ is accumulated in the capacitor. The signal RAN of FIGS. 6A and 6B which shows the repetition of the above processing cycle is adapted to indicate that the multiplexer I 91 is selected by the random number generator 190, and an Address Count inhibit signal is adapted to inhibit the address 1 from being produced.

More specifically, the feedback operation via the common analog bus CB is made by the daisy chain operation in the sequential order of the ANP1, ANP2 and ANP3 and only one ANP selected by the random number generator 190 through the multiplexer 191 calculates the thus fed-back data. That is, the selected ANP calculates data sequentially returned from the ANP1, ANP2 and ANP3 in a product and sum fashion. At the completion of this product and sum calculation, the random number generator 190 selects another ANP. Then, the newly selected ANP calculates output signals sequentially fed back to the ANP1, ANP2 and ANP3 in a product and sum fashion in accordance with the daisy chain operation.

Figure 7:
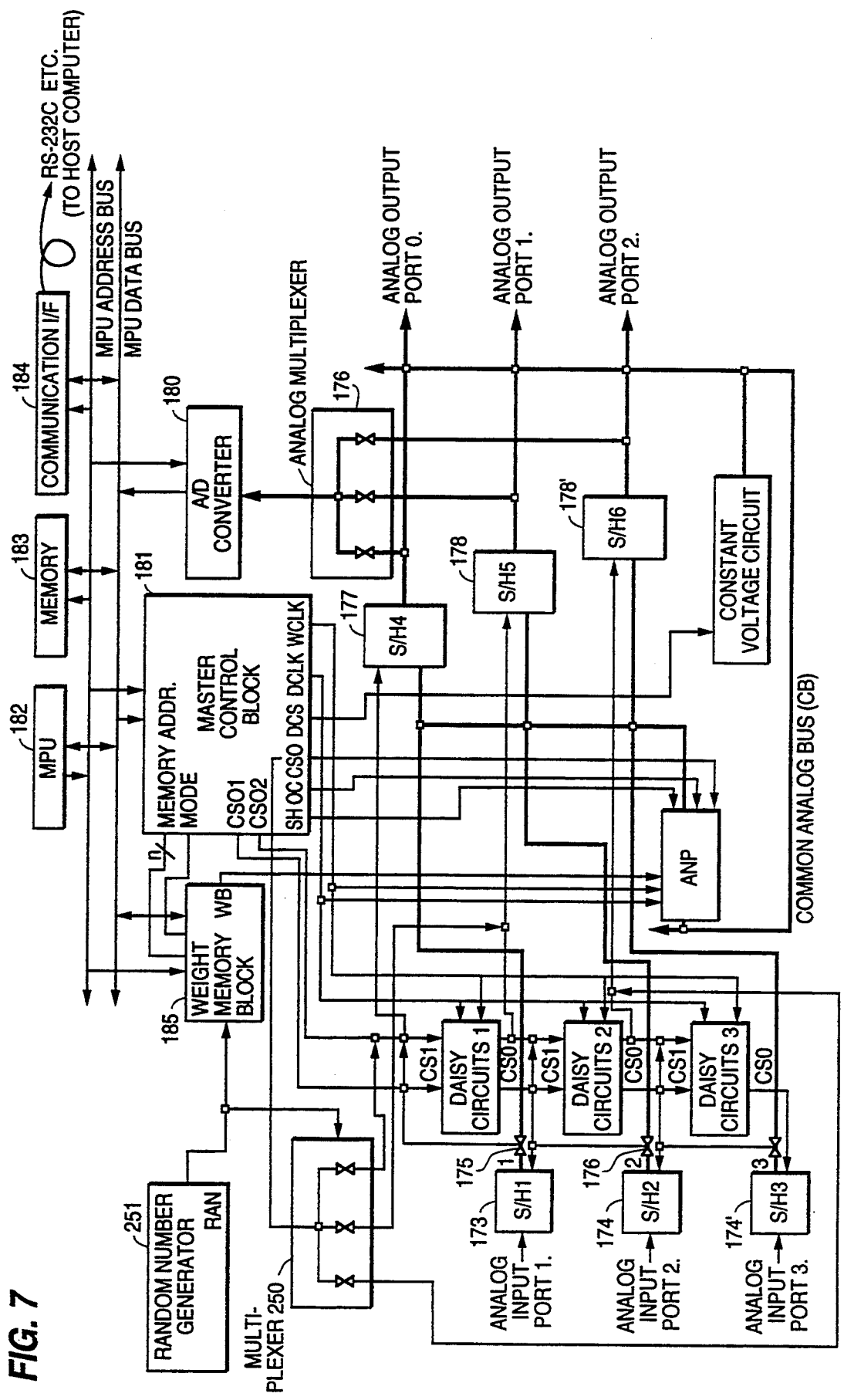
FIG. 7 shows a block diagram of an embodiment of the second invention.

FIG. 7 shows another embodiment of the present invention, wherein a virtual cross-coupling type neural network formed of three neurons is realized by coupling outputs of three sample and hold circuits to an input of one ANP by means of the common analog bus CB of C-letter configuration. FIGS. 8A and 8B is a timing chart. In FIGS. 7 and 8A to 8B, parts corresponding to FIGS. 5 and 6A to 6B are marked with the same references and therefore are not described in detail again.

Outputs of the memory address terminal and of the mode terminal of the master control block 181 are applied to the weight memory block 185. Data output WB of this weight memory block 185 is coupled to the ANP.

<Input of Initial Value>

An initial value $x1(0)$ of virtual neuron 1 is supplied to the analog input port 1, an initial value $x2(0)$ of virtual neuron 2 to the analog input port 2 and an initial value $x3(0)$ of virtual neuron 3 to the analog input port 3.

1) The output signal 1 from the CSO terminal of the master control block 181 is supplied to the daisy circuit (1) 171, the switch (1) 175 and the sample and hold circuit (1) 173. At the leading edge of this output signal, the signal $x1(0)$ applied to the analog input port 1, is sampled by the sample and hold circuit (4) 177. At that time, the CSO1 signal enables the sample and hold circuit (4) 177 via a line 255.

2) The CSO1 signal is delayed by a predetermined delay time by the daisy circuit (1) 171 and is thereby produced as the CSO signal. This CSO signal is supplied to the daisy circuit (2) 172 as the signal CSI during the cycle 2, whereby the signal $x2(0)$, applied to the analog input port 2, is sampled by the sample and hold circuit (5) 178. 3)

Similarly, during the cycle 3, the signal $x3(0)$, applied to the analog input port 3, is sampled by the sample and hold circuit (6) 178'.

<Processing cycle>

4) The CSO2 signal is output from the master control block 181 in the cycle 4, and the analog output signal $x1(0)$ from the sample and hold circuit (4) 177 is fed through the common analog bus CB back to the input side.

The weight memory block 185 is supplied with the random number signal RAN in order to select the weight set which derives the data output WB.

The random number signal RAN is generated from a random number generating circuit 251 and this random number generating circuit 251 randomly selects any one of the sample and hold circuits (4) 177, (5) 178 and (6) 178' to generate the signal RAN in synchronism with the processing cycle.

The ANP loaded with weight set $wi=(wi1, wi2, wi3, w1)$ from the data output WB calculates the signal $x1(0)$ in a product and sum fashion. As shown in FIGS. 8A and 8B, the ANP performs one product and sum calculation during one cycle of the DCLK signal. When the DCLK signal is high in level, the weight clock WCLK is generated and the digital weight data wi1 input in synchronism with the weight clock WCLK, and the signal x1(0) supplied to the analog bus B1 from the address input port 1 are multiplied with each other at a timing shown by 4 in FIG. 8A. When the DCLK signal is low in level during the latter half of one cycle, the sample/hold signal SH goes high in level so that the sum operation is carried out in the capacitor of the integrator within the ANP.

When the OC signal from the master control block 181 goes high in level, only one ANP performs the offset cancel operation. When the sample/hold signal SH goes high in level again, the sample and hold operation is carried out and one product and sum calculation is ended, thereby a charge corresponding to wi1x1(0) accumulated in the capacitor.

5) The input signal CS1 of the daisy circuit (2) 172 goes high in level during the cycle 5, and the ANP calculates the signal x2(0) from the sample and hold circuit (5) 178 in a product and sum fashion, thereby a charge corresponding to wi1x1(0)+wi2x2(0) accumulated in the capacitor.

6) Similarly, the ANP calculates the signal x3(0) of the sample and hold circuit 6 during the cycle 6, thereby a charge corresponding to wi1x1(0)+wi2x2(0)-+wi3x3(0) is accumulated in the capacitor.

7) The ANP, which is supplied with the DCS signal from the master control block 181, calculates the fixed voltage v and the weight wi in a product and sum fashion during the cycle 7, thereby a charge corresponding to wi1x1(0)+wi2x2(0)+wi3x3(0)+wiv is accumulated in the capacitor.

8) The CSO signal from the master control block 181 turns on the sample and hold circuit (i.e., the sample and hold circuit is placed in the sample mode). This signal CSO is input to a multiplexer 250. The multiplexer 250 is coupled to the respective sample and hold circuits (4) 177, (5) 178 and (6) 178' and can select one of the above sample and hold circuits to be supplied with the signal CSO by an output signal RAN from a random number generating circuit 251. For example, the CSO signal is input through the line 252 to the multiplexer 250 and by the output from the random number generator 251; a line 254, same example, is selected as the output of the multiplexer 250 through a line 253. Thus, the sample and hold circuit (5) 178 is enabled so that the output signal of the ANP is sampled and held.

When the CSO signal is input to the ANP, then the analog output signal xi(1), which results from converting the wi1x1(0)+wi2x2(0)+wi3x3(0)+wiv by the sigmoid function circuit, is held by the selected sample and hold circuit, for example, the sample and hold circuit (4) 177.

In synchronism with the product and sum calculation cycles of 4), 5) and 6), the outputs xi(1) of the sample and hold circuits i (i=1, 2, 3) are output to the analog output ports.

Furthermore, these outputs are supplied through the A/D converter 180 to the digital control circuit formed of the MPU 182, the memory 183 and the communication interface 184. The MPU 182 is used to determine if the neuron output xi(1) of the present time is equal to the neuron output xi(0) of the last time. If the condition that the outputs xi(1) and xi(0) are equal to each other is continued longer than a predetermined time, then it is determined that the output pattern of the neuro computer is converged.

The output pattern of the neuro computer can reach the stable solution by repeating the above-mentioned processing cycles.

FIG. 9 shows a system block diagram of a neuron computer of the present invention.

Neural network 218 receives analog signals from the common first analog bus provided on the input side of respective layers in a time divisional manner, carries the sum of the products by using digital weight data, and provides the analog signals to the second common analog bus provided on the output side of respective layers, thereby forming a set of analog neuron processors (ANP).

Control pattern memory 212 stores a control signal pattern of the neural network. Weight memory 214 stores weight data. Sequencer 213 produces an address of control pattern memory 212 and weight memory 214. Digital control means 215 comprises a general purpose processing unit including an MPU and a main storage. It is connected through network 218 and D/A and A/D converters 216 and 217, respectively, and further controls the neural network, control pattern memory sequencer and weight memory as a whole. Input control means 219 is provided at an input stage of ANP network 218 for performing a learning function. The input control means receives an analog input signal from the digital control means. An analog input signal is input to an analog neuron chip in a time divisional manner and the products of the signal and the weight data are added to provide a sum-of-the-products signal. This signal is then output through a nonlinear function circuit. An analog neuron chip is formed with the above components. A plurality of analog neuron chips forms a layered-type or a feedback type neural network 218 and provides an output from control memory 212, whose address is provided by sequencer 213. The weight data obtained from a learning process is supplied to neural network 218 from weight memory 214. Neural network 218, control pattern memory 212, sequencer 213 and weight memory 214 are controlled and managed by a digital signal from digital control means 215. The MPU in digital control means 215 executes a learning algorithm and checks an output signal. Therefore, an analog neuron computer system is characterized by a time divisional analog input signal and a time divisional analog output signal.

Figure 10:
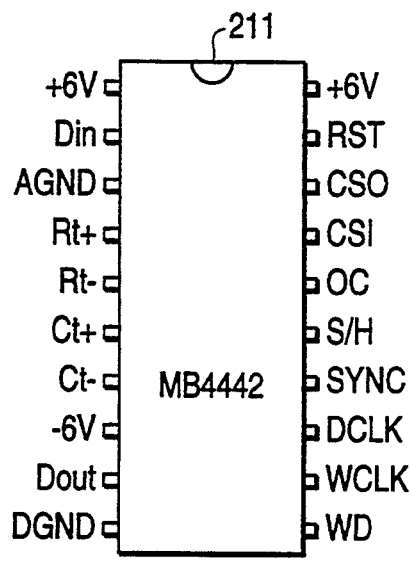
FIGS. 10, 11, 12 and 13 show block diagrams of the ANP.

FIG. 10 is a schematic view of a dual-inline package of an analog neuron processor (ANP) 211 formed by a neuron chip provided by the present invention. This package, called MB4442, carries out neuron model processes. The internal threshold value processing unit is obtained by performing a sigmoid function. The analog neuron chip comprises an ANP for inputting and outputting analog data. Respective terminals of ANP 211 shown in FIG. 10 are as follows. The internal structure of ANP 211 comprises an analog circuit unit and a digital circuit unit. Plus-6-volt and minus-6-volt terminals are connected to a power source in an operational amplifier of an analog circuit unit. Terminals $D_{in}$ and $D_{out}$ are for inputting and outputting analog signals, respectively. Terminal AGND is for the ground of the analog circuit unit. Terminals Rt+ and Rt− are for a resistor R provided externally to form an integrating circuit in the analog circuit unit and terminals Ct+ and Ct− are for a capacitor provided externally to form an integrating circuit. Terminal DGND is for the ground of a digital circuit unit. The plus-5-volt terminal is for the power source of the digital circuit unit. The RST terminal is for receiving reset signals for resetting the charge of the capacitor in the integral digital circuit. Terminals CSI and CSO are for inputting and outputting daisy chain control signals, respectively. Terminal OC is for receiving offset canceling control signals. Terminal SH is for receiving sample/hold control signals. Terminal SYNC is for receiving signals for synchronizing processes of respective layers. Terminal DCLK is for receiving basic clock signals for processing the analog input signal. Terminal WCLK is for a clock for obtaining digital weight data. Terminal WD is for receiving digital weight data for inputting data in bit serial form.

Figure 11:
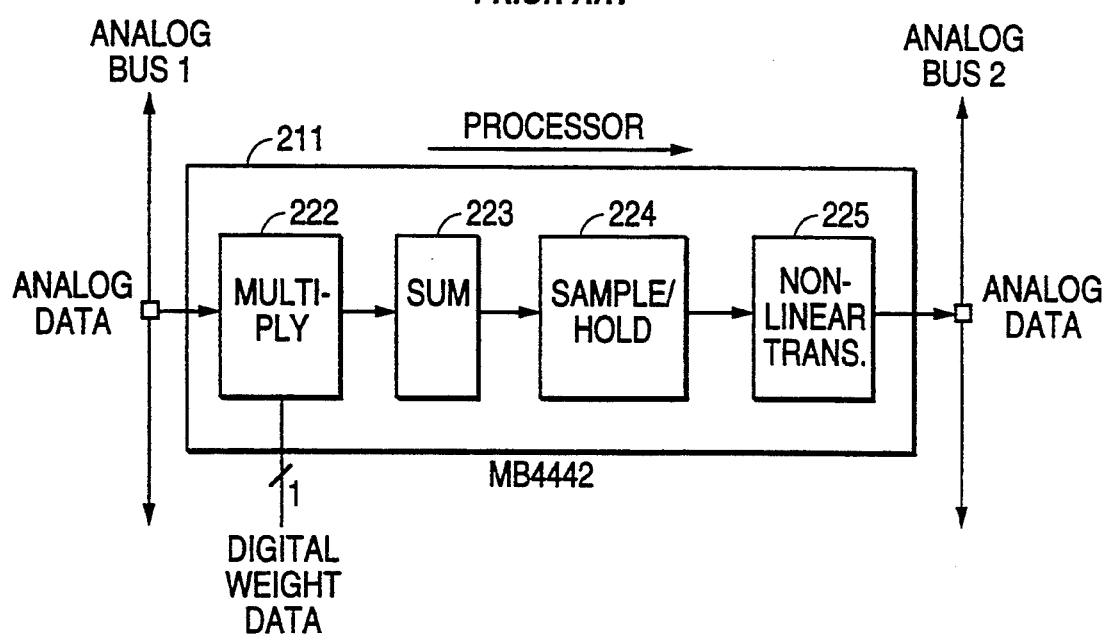

FIG. 11 is a schematic view of the internal structure of an ANP of the present invention. As shown, ANP 211 is connected to analog bus B1 and analog bus B2. Analog processor ANP 211 comprises analog multiplying unit 222 for providing the product of the input analog signal and the weight, analog adder unit 223 for providing the sum of the products, sample/hold unit 224 for storing the sum, and nonlinear function unit 225 for outputting the value of the sigmoid function.

Figure 12:
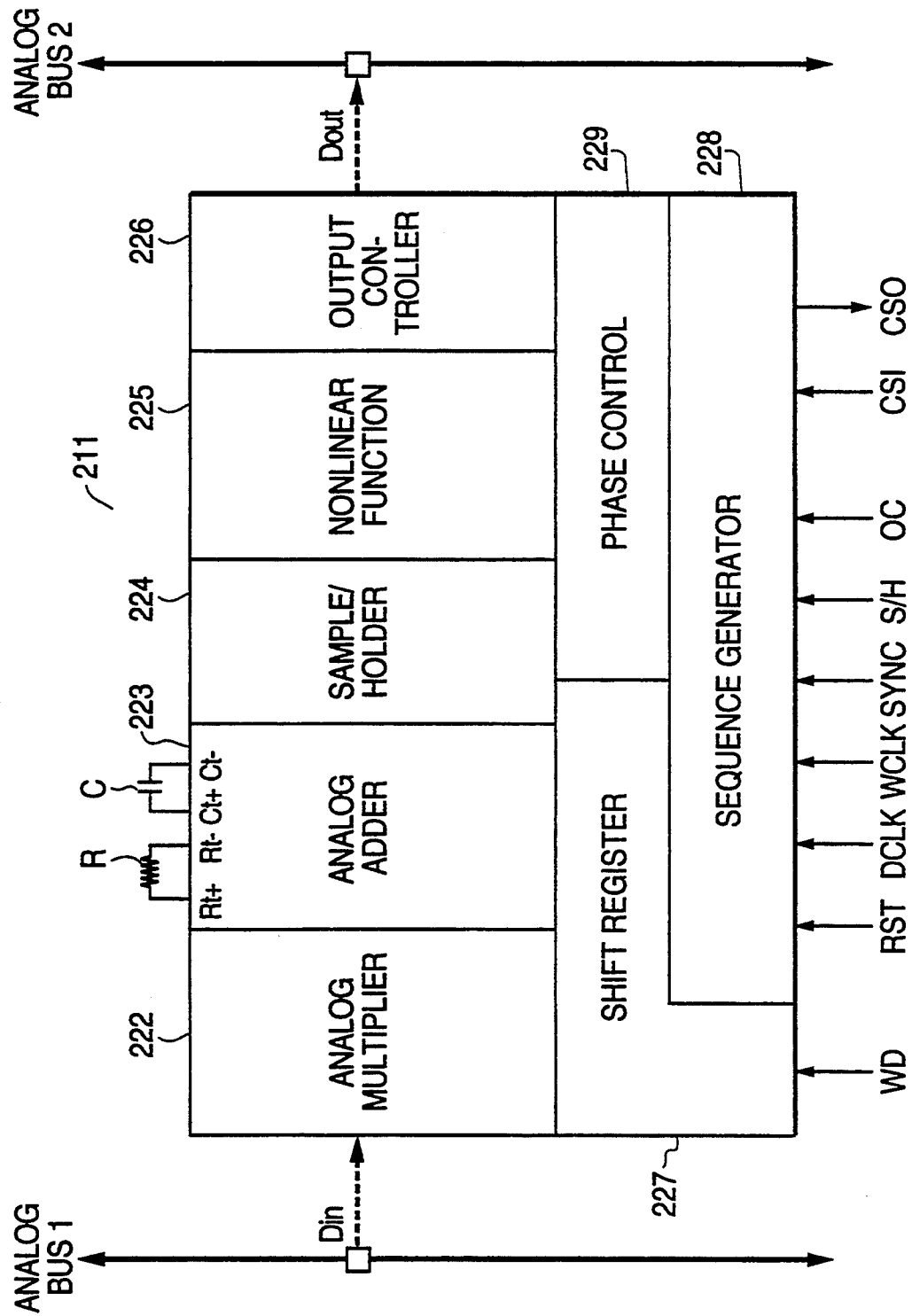

FIG. 12 shows the structure of an analog neuron processor (ANP) of the present invention.

Analog input signals transmitted in a time divisional manner from separate ANP's are input to analog multiplier unit 222 in ANP11 through analog bus B1. Analog multiplier 222 multiplies the analog input data by the digital weight data WD which is received in bit serial form from shift register 227 and is then subjected to a serial-to-parallel conversion, thereby providing a product signal representing the product of the analog input signal and the digital weight data. Analog adder 223 comprises a mirror integrating circuit containing an external resistor R and a capacitor C, and obtains the sum of the respective product signals obtained from the analog input signal transmitted in a time divisional manner from a plurality of ANPs (the position in which each of the ANPs exists is called a node) provided at the previous stage and connected to analog bus B1, and obtained from the analog input signal for a threshold value transmitted from a dummy node. Next, the product signals are held by sample-hold unit 224 for the desired time period and the sampled/held output is converted through non-linear type function unit 225. Output control unit 226 delays the output of nonlinear function unit 225 for a predetermined time period under the control of sequence generator 228. The analog output signal DOUT is then output to analog bus B2. Sequence generator 228 produces a control signal to be supplied to the inside of this computer system. Phase control unit 229 controls the phase of a control signal to ensure that the switches connected to the analog circuit portions within the ANP and digital circuit portions are turned on and off. In particular, when the first switch is turned on and the second switch is turned off, the phase of the control signal is controlled to prevent both first and second switches from being turned on simultaneously.

Sequence generator 228 receives signals RST, DCLK, WCLK, SYNC, and CSI from a later described master control block and outputs a CSO, thereby forming a control signal within the ANP.

Neural networks are required to perform high speed operations using parallel processing. The present invention uses time divisional data, but respective ANPs normally perform parallel pipe line processing. An ideal neural network needs connecting wires for connection between respective neurons. Thus, the above structure would require a lot of wires. The present invention deals with time divisional data. Thus, the time required to process a sum of products in respective ANPs becomes a little long. However, respective ANPs are arranged vertically, namely, in the direction of one layer parallel with another, thereby performing parallel processing of ANPS provided within one layer and thus decreasing processing time. In addition, a pipeline process is possible between layers, which also decreases total processing time. When inputs are received simultaneously and in parallel by, for example, three ANPS connected to an analog bus, the respective ANPs produce products of analog inputs and weights. These products are maintained as electric charge in capacitors of integrators in respective ANPS. In the next time period, respective ANPs produce products of analog inputs from the same analog bus and weights. These products are added to those determined in the previous time period in the capacitors of the integrators. When the sum of the products of the analog input signals from all the ANPs in the previous stage with the weight are produced, the sum is sampled/held. Thereafter, the sample/hold signal is outputted through a sigmoid function upon the input of a CSI control signal. Upon completion of the output, the CSI goes low. A CSO then rises after a predetermined delay, thereby providing the access right of the output bus to the ANP of the adjacent neuron chip within the same layer.

Figure 13:
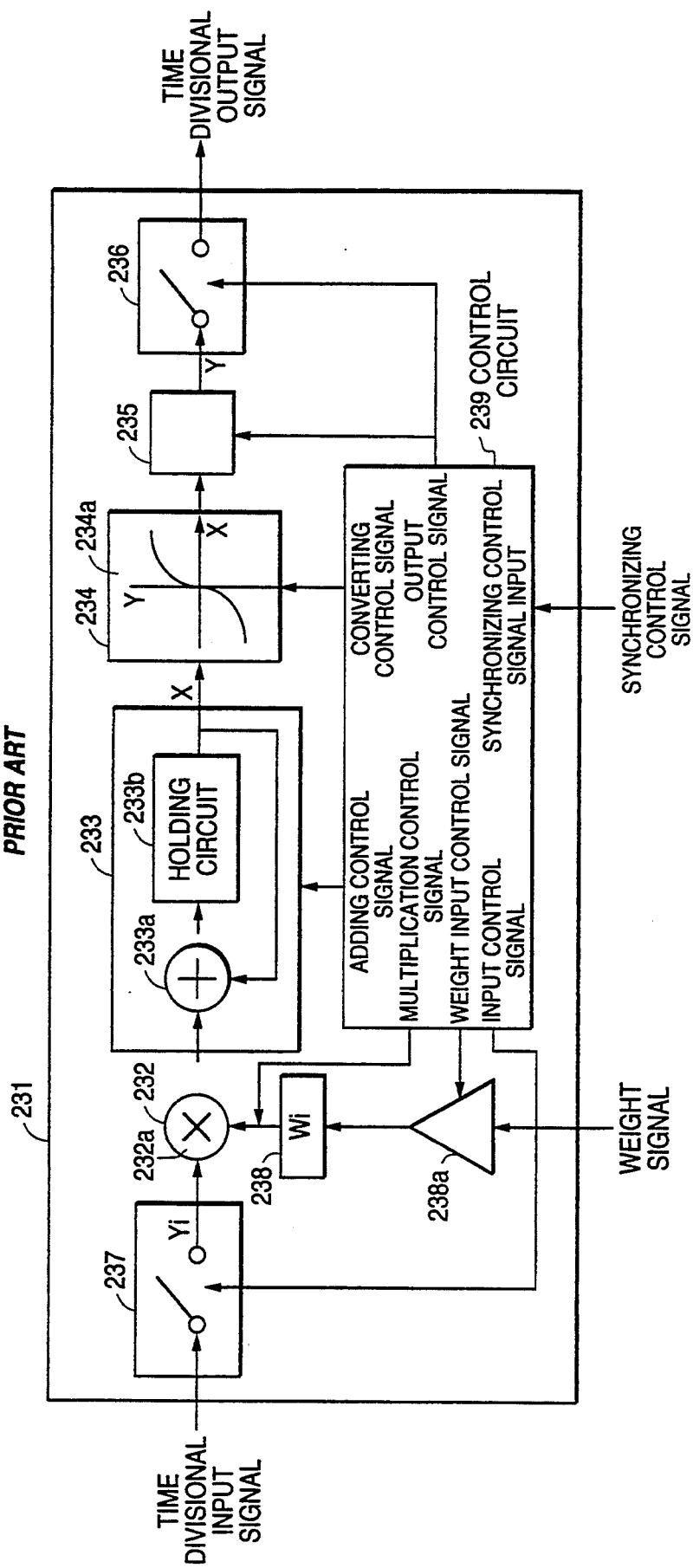

FIG. 13 shows a block diagram of the embodiment of the basic unit of the neuron chip (ANP). Multiplying unit 232, adding unit 233 and threshold value process unit 234 constitute an execution unit of a continuous neuron model. Output holding unit 235 is also provided. Where a plurality of inputs connected to basic unit 231 is expressed as Yi and the weight determined corresponding to respective connections as Wi, multiplying unit 232 calculates $Y_i \cdot W_i$ Adding unit 233 calculates $X = \Sigma Y_i \cdot W_i - \theta$ where $\theta$ is a threshold value. Where a final output from threshold value unit 234 is Y, the following equation is calculated.

$$Y = 1/(1 + 9 \exp(-X)) \tag{1}$$

The weight "$\theta$" is multiplied by the value "+1", input from tile dummy node. The result "$x - \theta$" is then output from the adding unit 233. Therefore, threshold value unit 234 performs a conversion by using an S character (sigmoid) curve.

Multiplying unit 232 comprises multiplying type D/A converter 232a. An analog signal (input through input switch 237) from basic unit 231 in the previous layer or from a later described dummy node circuit is multiplied by the weight information (input through the later described weight holding unit 238) of the digital signal and the resulting product is output as an analog signal. Adding unit 233 comprises analog adder 233a (composed of an integrator) and holding circuit 233b (for holding the added result of analog adder 233a).

Multiplying type D/A converter 232a receives an analog input signal at reference voltage terminal of D/A converter 232a and respective bits of the weight at respective digital input terminals as the digital input signal, and multiplies the analog input signal by the weight. Analog adder 233a adds the resulting product output from multiplying type D/A converter 232a to the added value obtained at the previous timing and held in holding circuit 233b, thereby providing a new added value. Holding circuit 233b holds the added value obtained by analog adder 233a and feeds back the held value to analog adder 233a as the previous added value. These adding processes are carried out in synchronization with the adding control signal output from control circuit 239. Threshold value unit 234 is composed of non-linear type function generating circuit 234a comprising an analog function generator. It outputs a non-linear type signal such as a sigmoid function in response to the input. When the accumulation of the multiplied result is completed, including addition of the threshold value $(-\theta)$, an operation process of the sigmoid function shown in equation (1) is performed by adding the threshold value $(-\theta)$ to the added value x held in holding circuit 233b, thereby providing the analog output value Y. Output holding unit 235 comprises a sample/hold circuit and holds that output value Y of the analog signal from non-linear type function generator 234a which constitutes an output to basic unit 231 in the following stage layer.

The output switch 236 is turned ON for a predetermined period upon receiving an output control signal from control circuit 239. The final output is maintained in output holding unit 235 and processed to be output on analog bus B2. An input control signal from control circuit 239 turns ON input switch unit 237 when an analog output is transmitted from the final output of basic unit 231 in the previous stage layer. Weight holding unit 238 comprises a parallel-out shift register. It maintains the weight signal as a bit parallel weight for multiplying unit 232 when the weight signal is bit serially transmitted from the weight memory and passes the gate on opening it (when the weight input control signal is turned on by controlling circuit 239). The bit-parallel weight data is provided to a multiplying unit when the multiplication control signal is provided. Control circuit 239 in the digital circuit unit produces a synchronizing signal for use inside the circuit based on an external synchronization signal and carries out a function of the analog process of the inside of the circuit.

As constructed above, the input and output signals of basic unit 231 with the signal process structure shown in FIG. 13 can be realized by using the analog signal. Multiplying type D/A converter 232a may receive the weight data of the digital signal in parallel or may convert the weight data into parallel data after receiving them as serial data. If the weight data takes the form of an analog signal, an analog multiplying circuit may be used instead of the multiplying type D/A converter 232a.

Figure 14:
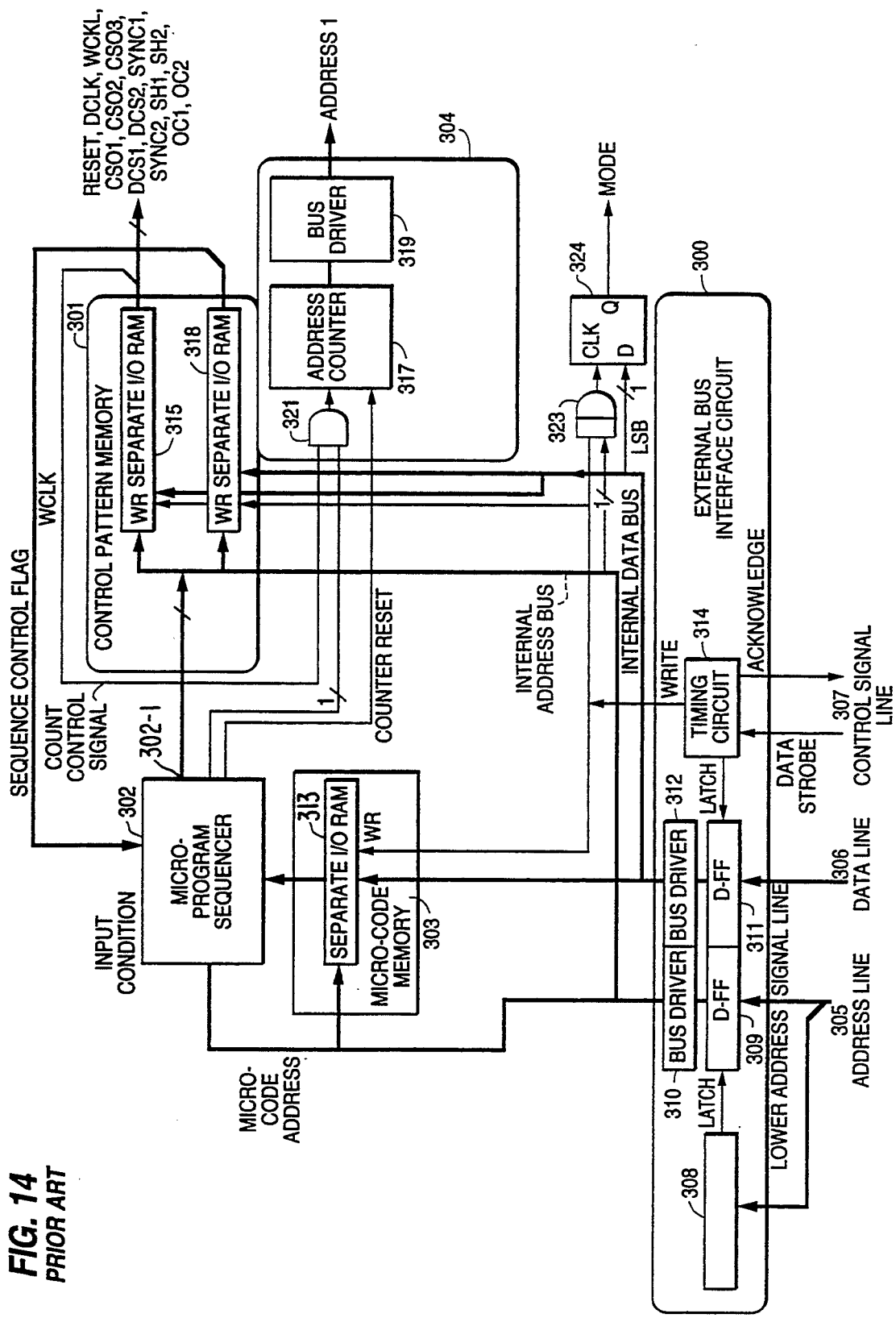
FIG. 14 designates a detailed block diagram of a master control block shown in FIGS. 5 and 7.

FIG. 14 shows the structure of master control block 181, which controls all the control signals. The main structure element comprises external bus interface circuit 300, control pattern memory 301, micro-program sequencer 302, micro-code memory 303 and address forming unit 304. External bus interface circuit 300 is connected to address line 305, data line 306 and control signal line 307 through an interface connected to the MPU. Upper address comparing circuit 308 and D-FF 309 of the register in external bus interface circuit 300 decodes the upper address given by the MPU. When the upper address is the same as the predetermined one, the lower address and data are set in D-FFs 309 and 311 by using a latch signal from timing circuit 314 as a trigger. The address and data are input through respective bus drivers 310 and 312, and through the internal address bus and the internal data bus. The address is used to refer to micro-code memory 303 from the MPU side through the data bus. The lower address is applied to micro-program sequencer 302 through bus driver 310 and I 5 the MPU can refer to control pattern memory 301 by using a predetermined address.

The data from the MPU main memory is latched by D-FF 311 to data line 306 and is applied to separate I/O RAM 313 in micro-code memory or separate I/O RAMs 215 and 316 in control pattern memory 301 through bus driver 312. The data strobe signal from the MPU or the memory is added to timing circuit 314 through control signal line 307 and the acknowledge signal is returned, thereby controlling the transmission, and receiving the address and data. Timing circuit 314 controls a latch timing to D-FF 311 and D-FF 309; it controls the writing timing to micro code memory 303 and control pattern memory 301 through the WR signal.

One period of each of the "1" and "0" patterns of a control signal given to the neuron chip, as shown in the timing charts of FIGS. 9A and 9B, are stored in control pattern memory 301 and read out from control pattern memory 301 in accordance with the control of micro-program sequencer 302, thereby producing one period of the patterns. For example, reset signal RESET, data clock DCLK, weight clock WCLK, CS01, CS02, CS03, SYNC1, SYNC2, SH1, SH2, OC1, OC2, are read from the first separate I/O RAM 315 The control information accompanied by the pattern, namely, the I 5 sequence control flag, is read from the second separate I/O RAM 316. Where the pattern "1000110001" is stored in control pattern memory 301, the address of control pattern memory 301 is controlled to repeat the bit comprising "1 and 0" and the repeated pattern is read from control pattern memory 301. Since the control signal patterns are extremely complex, they are previously stored in separate I/O RAM 315 and the bit pattern is sequentially output by designating the address of separate I/O RAM 315 under control of micro-program sequencer 302. Thus, a plurality of the same patterns is repeated, as determined by the address control. One pattern period is called an original pattern. In order to repeat the original pattern, specific information is fed back to micro-program sequencer 2 from control memory 301. The sequencer control flag within the second separate I/O RAM 316 is input to micro-program sequencer 302, which generates the address so that the addressing is returned to the head address in which the original pattern is stored in the first I/O RAM 315. Thus, the original pattern is repeated. Micro-program sequencer 302 transmits an address signal to separate I/O RAM 315 through general purpose port output line 302-1 until the required condition is satisfied. Normally, the address is incremented but the address signal is returned to the head address in which the original pattern is stored. As a result, a predetermined control pattern is repeatedly output ted from separate I/O RAM 215.

FIG. 15 shows the relationship between the information of memories 301 and 303 for controlling master control block 181. In FIG. 15, control pattern memory I corresponds to the first separate I/O RAM 315 and control pattern memory 2 corresponds to the second separate I/O RAM 316. The control code of sequencer 302 is stored in micro-code memory 303, which stores mainly jump commands and repeat commands. Repeat commands are stored in predetermined addresses and the number of the control pattern repetition in the control pattern memory is stored in the corresponding address of control pattern memory 2 in accordance with the repetition command. When this number reaches "10", ten repetitions are carried out. In this way, the address increases until it reaches a jump command in micro-code memory 203 and the address jumps to 500 H according to the second jump in microcode memory 303, thereby producing pattern 2. These addresses jump to "100H" again, the third jump within the micro-code memory 303, thereby outputting pattern PAT1. Thus, the original pattern is repeated and read out from control pattern memory 1.

WCLK is formed in synchronization with the reading clock of the address referred to by control pattern memory 301 and information is read out from weight memories 185 and 186 in synchronization with WCLK. The addresses of weight memories 185 and 186 are accessed by the address signal output from addresses 1 and 2 of address forming unit 304. Addresses 1 and 2 are separated, address 1 being for the hidden layer and address 2 being for the output layer. The weight data applied to the ANP in the hidden layer is read out from weight memory 185 designated by address 1. The weight data applied to the ANP in the output layer is read out from weight memory 186 designated by address 2. The content of weight memories 185 and 186 are stored bit by bit in the increasing direction of the address and it is necessary to apply a count control signal to address counters 317 and 318 from micro-program sequencer 302. Incrementing addresses are applied sequentially to weight memories 185 and 186. WCLK from the first separate I/O RAM 315 and a counter control signal from micro-program sequence 302 are applied to AND circuits 321 and 322 in address forming unit 304. When the counter control signal is high, the address counter is updated by WCLK. Address counters 317 and 318 are incremented from 1 to 16 bits of WCLK. The remaining 17 to 26 bits of WCLK are inhibited by turning the counter control signal low and stopping incrementing address counter 317 and 318. A counter reset signal is transmitted to AND circuits 321 and 322 from microprogram sequencer 302 in synchronization with SYNC1 and SYNC2 and reset address counters 317 and 318. The address is returned to the head address of weight memories 185 and 186. The mode signal output from master control block 181 comprises a mode designating an ordinary use of the weight memory, namely, separating the weight memory from the MPU data bus to apply the weight data to the ANP and a mode in which the weight memory is connected to MPU data bus and is referred to by the MPU.

The LSB of the data from the MPU to flip-flop 324 is used by a trigger signal and an AND signal is output from AND circuit 323 when a bit of the lower address and write signal WR from timing circuit 314 are applied to AND circuit 323. When the mode signal is 0, the weight memory is for an ordinary use.

Write signal WR and a bit of the internal address bus are input to a clock terminal of flip-flop 324 through AND circuit 323 and the LSB of the internal data bus is input to the data terminal of flip-flop 324. The upper address signal is input to comparing circuit 308 and it is determined whether master control block 181 is selected. If it is, the lower address and data are applied to DFFs 309 and 311. This interface operation is applied to the other devices connected to the MPU and the weight memory supplies the weight data to the ANP during a normal period, and if the weight memory is directly connected to the data bus of the MPU, bus competition is caused. To prevent this, the mode is determined as 1 when LSB of the data bus is supplied to the flip-flop, thereby preventing the weight memory from being chip-selected and producing the data on the data bus from weight memory. The internal address bus designates the addresses of either micro-code memory 303 or control pattern memory 301 by using the internal address bus. The desired data is written into the accessed address via the internal data bus. Thus, the program stored in micro-program sequencer 302 is selected, and the programs stored in micro-code memory 303 and separate I/O RAM 316 are changed and the control pattern stored in separate I/O RAM 315 is changed.

What is claimed is:

1. An asynchronous control system for a neuro computer, comprising:

a neural network composed of a plurality of analog neuro processors for receiving analog signals from an analog bus in a time-division fashion, for producing and summing the analog signals, thereby for outputting a sum-of-product signal and for outputting an analog signal generated by converting said sum-of-product signal using a non-linear function;

a weight memory, connected to said neural network, for storing weight data for said plurality of analog neuro processors and an address signal;

a controller, connected to said neural network, for generating control patterns which control said plurality of analog neuro processors of said neural network and said address signal of said weight memory;

connecting means for selectively connecting said controller to said plurality of analog neuro processors and for selecting said control patterns to be used to control said plurality of analog neuro processors; and a random number generator, connected to said connecting means, for randomly generating and outputting a random signal to said connecting means, so that said control patterns are randomly selected by said connecting means responsive to said random signal.

2. An asynchronous control system for a neuro computer, comprising:

a neural network composed of a single analog neuro processor for receiving analog signals from an analog bus in a time-division fashion, for producing and summing the analog signals, thereby for outputting a sum-of-product signal and for outputting an output analog signal by converting said sum-of-product signal using a non-linear function;

a plurality of sample and hold circuits, connected to said neural network, for receiving and holding an output signal of said single analog neuro processor;

a weight memory, connected to said neural network, for storing weight data for said single analog neuro processor;

a controller, connected to said neural network, for generating control patterns which control said neural network and an output of said weight memory;

selecting means connected to said plurality of sample and hold circuits for selecting one of said plurality of sample and hold circuits to output said output signal; and a random number generator, connected to said switching means, for randomly generating and outputting a random signal to said selecting means for selecting said output of said weight memory responsive to said random signal corresponding to the selecting of said selecting means, so that said control patterns and said output of said weight memory are randomly selected during one processing cycle of the neuro computer.

* * * * *

UNITED STATES PATENT AND TRADEMARK OFFICE
CERTIFICATE OF CORRECTION

PATENT NO. : 5,369,731
DATED : November 29, 1994
INVENTOR(S) : Daiki MATSUMOTO

It is certified that error appears in the above-indentified patent and that said Letters Patent is hereby corrected as shown below:

Column 1, line 33, "a needs" should be --needs a--.

Column 2, line 49, "$(W_{ij}=W_{ji})is$" should be --$(W_{ij}=W_{ji})$ is--.

Signed and Sealed this

Twenty-first Day of February, 1995

Attest:

BRUCE LEHMAN

*Attesting Officer*   *Commissioner of Patents and Trademarks*